March 26, 1957 M. W. SLATE 2,786,984
PRINTED-CIRCUIT SHIELD
Filed Dec. 30, 1952 2 Sheets-Sheet 1
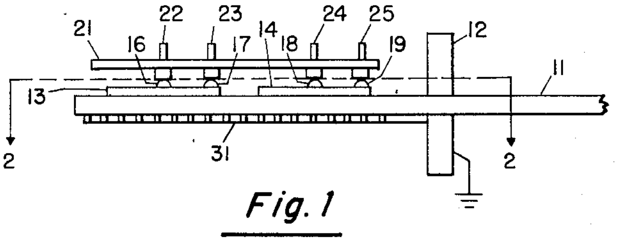
Fig. 1
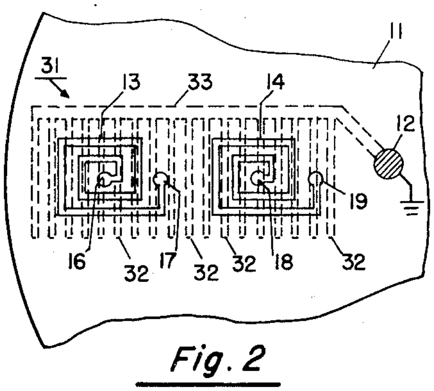
Fig. 2
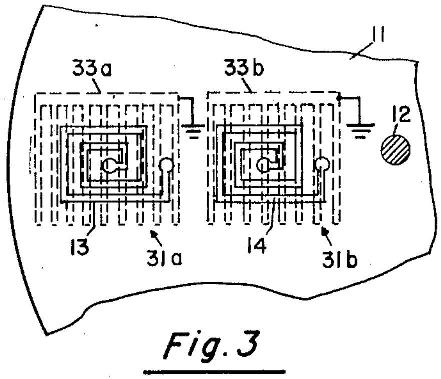
Fig. 3
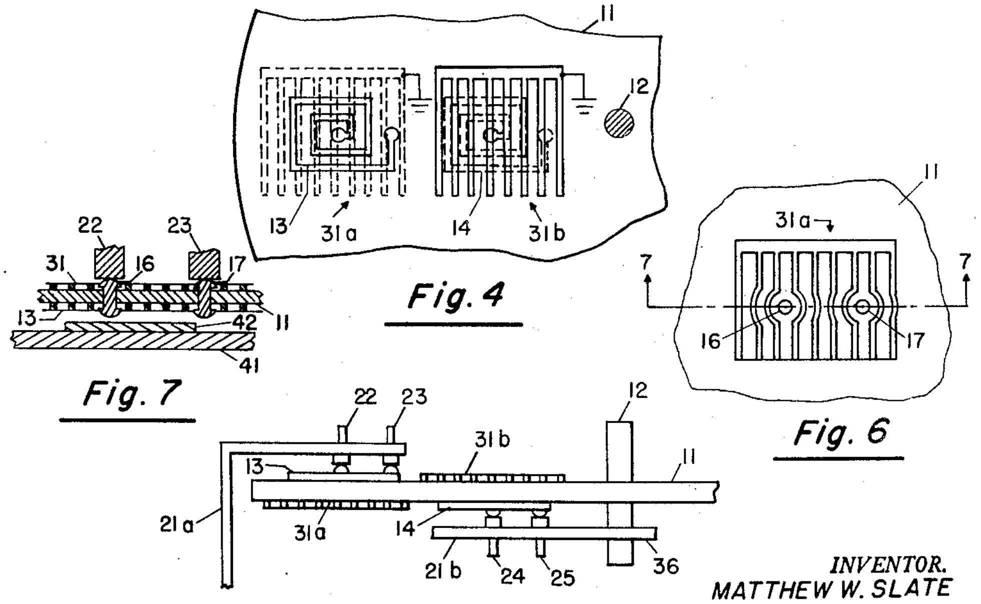
Fig. 4, Fig. 7, Fig. 6
Fig. 5
INVENTOR.
MATTHEW W. SLATE
BY Darby & Darby
ATTORNEYS March 26, 1957 M. W. SLATE 2,786,984

PRINTED-CIRCUIT SHIELD

Filed Dec. 30, 1952 2 Sheets-Sheet 2

INVENTOR.
MATTHEW W. SLATE
BY Darby & Darby
ATTORNEYS 2,786,984
Patented Mar. 26, 1957

2,786,984

PRINTED-CIRCUIT SHIELD

Matthew W. Slate, New York, N. Y., assignor to Allen B. Du Mont Laboratories, Inc., Clifton, N. J., a corporation of Delaware Application December 30, 1952, Serial No. 328,588

3 Claims. (Cl. 336—84)

This invention relates to television and radio tuners employing printed-circuit techniques, and particularly to a novel printed-circuit electrostatic shielding structure for use in combination with such tuners.

In prior art tuners and other devices employing printed inductance coils, it has been difficult to avoid an undesired electrostatic coupling between adjacent coils. Accordinly, an object of the invention is to provide a printed-circuit tuning device having improved electrostatic shielding between inductance coils.

Further, although it has been customary to employ a Faraday shield between coils to provide electrostatic shielding, it has been impractical to employ such shields with printed-circuit coils which are positioned in the same plane on an insulative surface.

Accordingly it is an object of the present invention to provide a novel structure wherein a Faraday screen provides partial or complete electrostatic shielding of printed-circuit coils.

Other objects will be apparent.

Referring to the drawing,

Fig. 1 shows an edge view of a printed-circuit tuner employing a preferred embodiment of the invention;

Fig. 2 is a view taken along the line 2—2 of Fig. 1;

Figs. 3 and 4 show alternative embodiments of the structure shown in Fig. 2;

Fig. 5 shows an edge view of the embodiment of Fig. 4;

Figs. 6 and 7 show top and sectional views, respectively, of an alternative embodiment of the invention;

Figure 8:
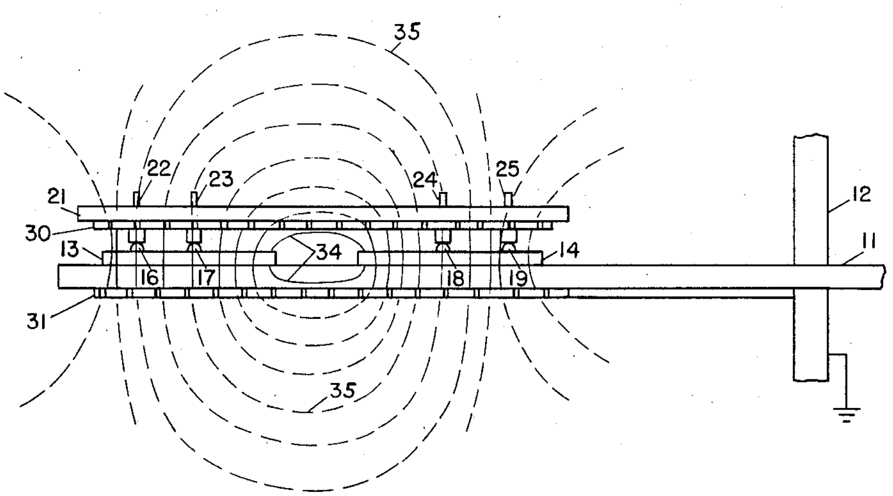
Fig. 8 shows a modification of the structure in Fig. 1 to obtain additional shielding.

In the embodiment of the invention shown in Figs. 1 and 2, there is provided a flat, insulative plate 11 rotatably positioned on a spindle 12. A plurality of spirally-shaped inductance coils 13, 14 are printed on a surface of the rotatable plate 11. Contact terminal pins 16, 17 are provided at the ends of the coil 13, and contact terminal pins 18, 19 are provided at the ends of the coil 14. The contact terminals extend upwardly above the top level of the coils 13, 14. The terminology "spirally-shaped" coil is used generically herein to denote any type of coil lying substantially in a plane. A support plate 21 is fixedly positioned in a parallel relationship and near the surface of the plate 11 on which the coils 13, 14 are attached.

Fixed electrical contacts 22, 23 are supported by and extend through suitable openings in the plate 21, to selectively engage the contact terminals 16, 17 when the plate 11 is rotated about the spindle 12. Similarly, fixed contacts 24, 25 are supported by and extend through suitable openings in the plate 21 to make selective electrical engagement with contact terminals 18, 19 when the plate 11 is rotated. Electrical circuits, not shown, may be connected to the fixed contact terminals 22 through 25.

An electrostatic shield member 31 is attached to the underside of the plate 11 in the vicinity of the coils 13,

14. The shield 31 preferably comprises a structure known as a "Faraday screen" in which a plurality of electrically conductive fingers 32 extend in a parallel manner from a grounded conductor 33. The conductor 33 may be grounded through the spindle 12 as shown, or may be grounded through an additional contact terminal (not shown).

The novel shielding structure, as shown, reduces the electrostatic coupling which would otherwise occur between the coils 13, 14. The Faraday shield 31 eliminates most of the electrostatic fields which would otherwise extend downwardly from the bottom sides of the coils 13, 14, and thereby prevents a mutual coupling or interaction of these fields. As shown in Fig. 8 the support plate 21 may be of insulative material having a second Faraday shield 30 attached thereto, so as to further aid the electrostatic shielding of the coils 13, 14, the plate 21 intercepting a substantial portion of the electrostatic fields which would otherwise extend upwardly from the coils 13, 14. Without the shielding, the electrostatic fields would extend upwardly and downwardly from the two coils 13 and 14 as shown by the electrostatic flux lines 33 and 34 and also tend to spread outwardly, thereby mutually engaging and causing undesired electrostatic coupling between the coils. With both shields 30 and 31 in place, only the electrostatic flux lines 34 couple the coils 13 and 14; electrostatic flux lines 35 are intercepted by the shields 30 and 31.

In the structure shown in Fig. 3, a separate grounded shielding screen is provided for each of the coils 13 and 14. A shielding screen 31*a* is positioned beneath the coil 13 whereas another shielding screen 31*b* is provided underneath the coil 14. Each shield is independently grounded, preferably through an additional contact terminal (not shown). This embodiment will provide improved shielding in certain cases because, since each shielding is grounded individually, there will be no common ground currents in the shielding structure.

In the embodiment shown in Figs. 4 and 5, one of the coils 13 is attached to the top surface of the rotatable plate 11, whereas the other coil 14 is attached to the bottom surface thereof. One of the shielding screens 31*a* is attached to the bottom surface of the plate 11 near the coil 13, whereas the other shielding screen 31*b* is attached to the upper surface of the plate 11 in the vicinity of the coil 14. A support member 21*a*, shown as being bent to provide an edge covering for the assembly, supports the contacts 22 and 23. A support member 21*b* which may be separate from the member 21*a* or which may be a continuation thereof, is shown as extending at an end 36 thereof to provide a pivot bearing for the spindle 12. Fixed contacts 24 and 25 are supported by and extend through suitable openings in the support member 21*b*. The fixed contacts 22 through 25 are positioned so as to selectively engage the contact terminals 16—19 of the coils 13 and 14 when the insulative plate 11 is rotated about the spindle 12. Preferably, each shielding screen is individually grounded as indicated in Fig. 4. This embodiment of Figs. 4 and 5 will provide improved shielding in certain instances over that of the other embodiments shown, since the shielding screen 31*a* eliminates the downwardly extending electrostatic field from the coil 13 and the shield 31*a* eliminates the upwardly extending field from the coil 14. Thus there is only a single field from the respective coils which tends to extend upwardly, and a single field extending downwardly; hence, there can be no interaction of electrostatic fields between the two coils 13 and 14.

Figure 9:
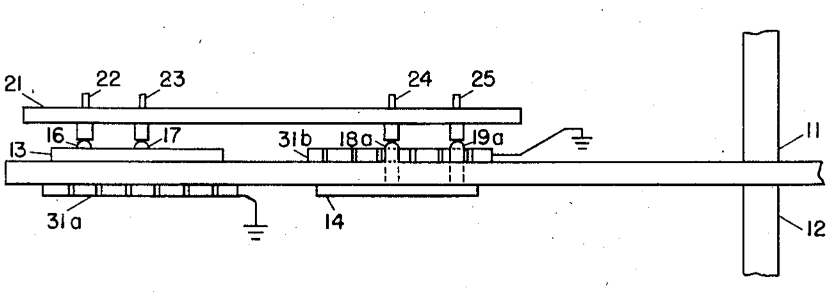
Fig. 9 shows a modification of the structure in Fig. 5.

Instead of providing two support plates 21*a* and 21*b* as shown in Fig. 5, a single support plate may be employed, on one side of the plate 11 as shown in Fig. 9, the contact terminals 18*a* and 19*a* of one of the coils 14 being arranged to extend through the plate 11, care being taken to extend these contacts between fingers of the Faraday shield 31*b*, or other expedients being taken to avoid electrical contact between the terminals and shield.

Figs. 6 and 7 show a preferred structure in which the coil 13 is on the bottom surface of the plate 11, the Faraday shield 31 being on the top surface thereof, and the contact pins 16 and 17 extending through the plate 11 and between fingers of the screen 31, the fingers near the contact pins being shaped as shown to avoid making electrical contact with these pins. A shading disc 41 has a conductive shading element 42 attached to the surface thereof, and is adapted to move near the coil 13 to affect the tuning thereof, as is more fully described in patent application, Serial No. 314,851, by David C. Felt, assigned to the same assignee. The shield 31, being positioned between the coil 13 and the contacts 22, 23 and other parts of the associated electrical circuits (not shown), provides shielding between these elements, in addition to its function, explained above, of reducing and shielding the electrostatic field of the coil 13.

While preferred embodiments of the invention have been shown and described, it will be apparent to those skilled in the art that the principles may be applied to any desired number of coils and physical arrangements, or to non-movable structures, and that modifications thereof may be made within the spirit and scope of the invention. The scope of the invention is defined in the following claims.

What is claimed is:

1. An electrical structure comprising an electrically insulative plate having substantially parallel top and bottom surfaces, a first spiral-shaped inductance coil positioned on said top surface, a second spiral-shaped inductance coil positioned on said bottom surface and planarly offset from said first coil, a first grounded Faraday electrostatic shield member positioned on said bottom surface overlapping said first coil, and a second grounded Faraday electrostatic shield member positioned on said top surface overlapping said second coil.

2. An electrical structure comprising an electrically insulative plate having substantially parallel top and bottom surfaces, a first spiral-shaped inductance coil positioned on said top surface and having a plurality of electrically conductive contact terminals; a second spiral-shaped inductance coil positioned on said bottom surface, planarly offset from said first coil, and having a plurality of electrically conductive contact terminals; a first electrically insulative support plate extending over said top surface and having a plurality of electrically conductive contacts to connect with said terminals on said first coil; a second electrically insulative support plate extending under said bottom surface and having a plurality of electrically conductive contacts to connect with said terminals on said first coil; a first grounded Faraday electrostatic shield member positioned on said bottom surface completely overlapping said first coil; and a second grounded Faraday electrostatic shield member positioned on said top surface completely overlapping said second coil.

3. An electrical structure comprising an electrically insulative plate having substantially parallel top and bottom surfaces, a first spiral-shaped inductance coil positioned on said top surface and having a plurality of electrically conductive contact terminals; a second spiral-shaped inductance coil positioned on said bottom surface, planarly offset from said first coil, and having a plurality of electrically conductive contact terminals extending through said plate to the top surface thereof; an electrically insulative support plate extending over said insulative plate and having electrically conductive contacts thereon to connect with all of said contact terminals on said top surface; a first grounded Farady electrostatic shield on said bottom surface completely overlapping said first coil; and a second grounded Faraday electrostatic shield on said top surface completely overlapping said second coil, said second shield having electrical conductors extending around and insulated from said contact terminals extending through said insulative plate.

References Cited in the file of this patent

UNITED STATES PATENTS

| | | |
|---|---|---|
| 1,651,658 | Young | Dec. 6, 1927 |
| 1,651,922 | Hughes | Dec. 6, 1927 |
| 1,701,334 | Palueff | Feb. 5, 1929 |
| 2,535,686 | Lawrence | Dec. 26, 1950 |
| 2,643,361 | Mackey | June 23, 1953 |

OTHER REFERENCES

"New Advances In Printed Circuits," National Bureau of Standards Miscellaneous Publication 192, pages 57 and 66.